United States Patent [19]

Tsukahara

[11] Patent Number: 4,989,107
[45] Date of Patent: Jan. 29, 1991

[54] MICROFLOPPY DISK DRIVE WITH CENTERING MECHANISM

[75] Inventor: Nobuhiko Tsukahara, Kanagawa, Japan

[73] Assignee: Sony Corporation, Tokyo, Japan

[21] Appl. No.: 887,080

[22] Filed: Jul. 17, 1986

[30] Foreign Application Priority Data

Jul. 23, 1985 [JP] Japan .................. 60-162272

[51] Int. Cl.$^5$ ........................................... G11B 17/022
[52] U.S. Cl. ............... 360/99.08; 360/99.12; 369/271
[58] Field of Search ............ 360/97, 99, 133, 87; 346/137; 369/261, 270–271

[56] References Cited

U.S. PATENT DOCUMENTS

| | | | |
|---|---|---|---|
| 4,445,155 | 4/1984 | Takahashi et al. | 360/99 |
| 4,445,157 | 4/1984 | Takahashi | 360/133 |
| 4,613,921 | 9/1986 | Holmes | 360/97 |
| 4,654,725 | 3/1987 | Wakaizami | 360/97 |
| 4,667,257 | 5/1987 | Chan | 360/99 |
| 4,697,216 | 9/1987 | Tsukahara | 360/97 |
| 4,700,245 | 10/1987 | Sakaguchi | 360/133 |
| 4,825,314 | 4/1989 | Maekawa et al. | 360/99.12 |

FOREIGN PATENT DOCUMENTS

| | | | |
|---|---|---|---|
| 0054089 | 3/1984 | Japan | 360/133 |
| 0087677 | 5/1984 | Japan | 360/133 |
| 0164953 | 8/1985 | Japan | 360/133 |
| 0256982 | 12/1985 | Japan | 360/133 |

Primary Examiner—David J. Severin
Attorney, Agent, or Firm—Philip M. Shaw, Jr.

[57] ABSTRACT

A disk drive apparatus is provided with a center positioning pin engageable with a center positioning aperture of a magnetic disk, and a drive pin establishing positioning and driving engagement with a driving and positioning opening formed in the disk. The drive pin is supported by a resilient member which is resiliently deformable and is pivotable retative to a turntable. The resilient member is preferably so arranged to cause pivotal movement of the drive pin to have substantially greater radial motion component in comparison with peripheral motion component, or to permit inclination of the drive pin relative to a vertical axis at least in a direction different from the direction of rotation of the turntable by the resilience. With this arrangement, the disk drive apparatus is capable of exerting higher rotational torque with an accuracy in centering of a magnetic disk to be driven and can minimize shifting of chucking point so as not to cause offset of indexes recorded in the disk. Furthermore, the disk drive apparatus can reduce a shock in chucking and whereby minimize or eliminate wear and/or deformation of a drive opening and a drive pin.

15 Claims, 5 Drawing Sheets

MICROFLOPPY DISK DRIVE WITH CENTERING MECHANISM

BACKGROUND OF THE INVENTION

1. Field of the Invention

The present invention relates generally to a disk drive apparatus for rotating a disk, such as a floppy disk, a microfloppy disk and so forth. More specifically, the invention relates to a chucking mechanism for a disk drive, which can accurately position or center the disk.

2. Description of the Prior Art

As is well known, magnetic disks, such as floppy disks, microfloppy disks and so forth, most commonly have a center aperture and a drive aperture offset from the center aperture. Generally, such a disk drive is provided with a center positioning pin engageable with the center aperture of the disk, and a drive pin which is engagable with the drive aperture of the disk. The center positioning pin and the drive pin project from a turntable which is driven to rotate by means of a known drive mechanism.

This type of magnetic disk and the disk drive apparatus adapted therefor is disclosed in U.S. Pat. No. 4,445,155, to Takahashi et al, on Apr. 24, 1984, which is assigned to the owner of the present invention. Disclosed in U.S. Pat. No. 4,445,155 is a flexible magnetic disk of typical microfloppy construction and a disk drive therefor.

The disclosed flexible magnetic disk cassette has a flexible disk enclosed in a cassette casing made of an upper half and a lower half. The lower half has a drive hole through which a center positioning pin of a disk drive apparatus may extend into the center aperture of a center core disk rigidly and non-removably secured at the center of the disk. The center core disk also has a driving and positioning means for receiving a drive pin of the disk drive apparatus. The driving and positioning means is structured so that engagement with the drive pin will cause the disk to move until the center aperture of the attached center core disk is in proper centering engagement with the positioning pin.

In order to drive the flexible magnetic disk as set forth above, the disk drive apparatus comprises a center positioning pin and a spring-biased drive pin provided on a rotational drive. The center positioning pin is inserted in the center aperture means. The spring-biased drive pin is inserted in the driving and positioning aperture means during operation. The spring-biased drive pin is spring-biased so as to permit tilting of the pin to effect an at least partial radial displacement of at least the top of the pin in a vicinity of the driving and positioning aperture means when engaged with the positioning aperture.

The prior-art disk drive apparatus discussed above encounters a drawback in that the rotational torque that can be applied to the disk is limited. In other words, when rotational torque in excess of a predetermined value is applied, the spring-biased drive pin can no longer be biased toward the peripheral edge of an opening constituting the driving and positioning means, i.e. the biasing force exerted on the drive pin will no longer be sufficient to establish firm contact between the peripheral edge of the opening and the drive pin. As a result, the disk cannot be accurately centered.

On the other hand, when driving a magnetic disk the highest possible rotational torque is considered to be desirable in order to reduce the need for highly accurate adjustment of the friction between the disk or a disk-lifting pad and a magnetic head of a recording and/or reproducing apparatus.

SUMMARY OF THE INVENTION

Therefore, it is a principle object of the present invention to provide a disk drive apparatus which allows higher rotational torque to be used without adversely affecting the accuracy of centering of the magnetic disk being driven.

Another object of the present invention is to provide a disk drive apparatus which can minimize displacement of the chucking point so as to prevent offset of the disk from a predetermined position.

A further object of the invention is to provide a disk drive apparatus which reduces the shock of chucking and thus minimizes or eliminates wear and/or deformation of a drive opening and a drive pin.

In order to accomplish the aforementioned other objects, a disk drive apparatus according to the present invention is provided for rotating a magnetic disk of the type having a center aperture and a driving and positioning aperture, comprising a rotary base means for rotating such a magnetic disk, said rotary base means having an upper surface mounting thereon for supporting the magnetic disk, a center pin fixedly mounted on said rotary base means for rotation therewith and adapted to engage the center aperture of the disk being driven and a drive pin adapted to engage the driving and positioning aperture of a disk. The drive pin can be displaced at least in a direction toward and away from said center pin in a plane substantially parallel with said upper surface of said rotary base for chucking and centering the magnetic disk on said rotary base.

A drive pin support means mounts the drive pin thereon and allows displacement of the drive pin in the plane within the driving and positioning aperture of a disk mounted on the rotary base means. The drive pin support means is pivoted on the rotary base means at a pivot point for shifting the drive pin in radial and circumferential directions. The pivot point of the drive pin support on the rotary base is selected for minimizing the circumferential component of displacement.

The drive pin support resiliently biases the drive pin to remain in the plane and is resiliently deformable for inclining the axis of the drive pin relative to an axis extending parallel to the center pin for establishing engagement between the drive pin and the driving and positioning aperture. The drive pin support exerts a resilient biasing force on the drive pin so that the axis of the drive pin will incline only in a non-circumferential direction, in particular the radial direction. Inclining the axis of the drive pin relative to an axis extending parallel to the center pin in a direction toward and away from the center pin establishes engagement between the drive pin and the driving and positioning aperture of a disk mounted on the rotary base means.

The microfloppy disk which is intended to be driven in conjunction with the present disk drive has a center positioning aperture which has a first and second centering edges and the driving and positioning aperture which has a centering edge and a driving edge. The drive pin support means of the present disk drive is pivotable for varying the relative radial distance between the center pin and the drive pin for chucking engagement between the center pin and the first and second centering edges of the center positioning aperture and between the drive pin and the centering edge and the driving edge of the driving and positioning aperture.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment illustrated but are for explanation and understanding only.

In the drawings.

DESCRIPTION OF THE PREFERRED EMBODIMENT

Figure 1:
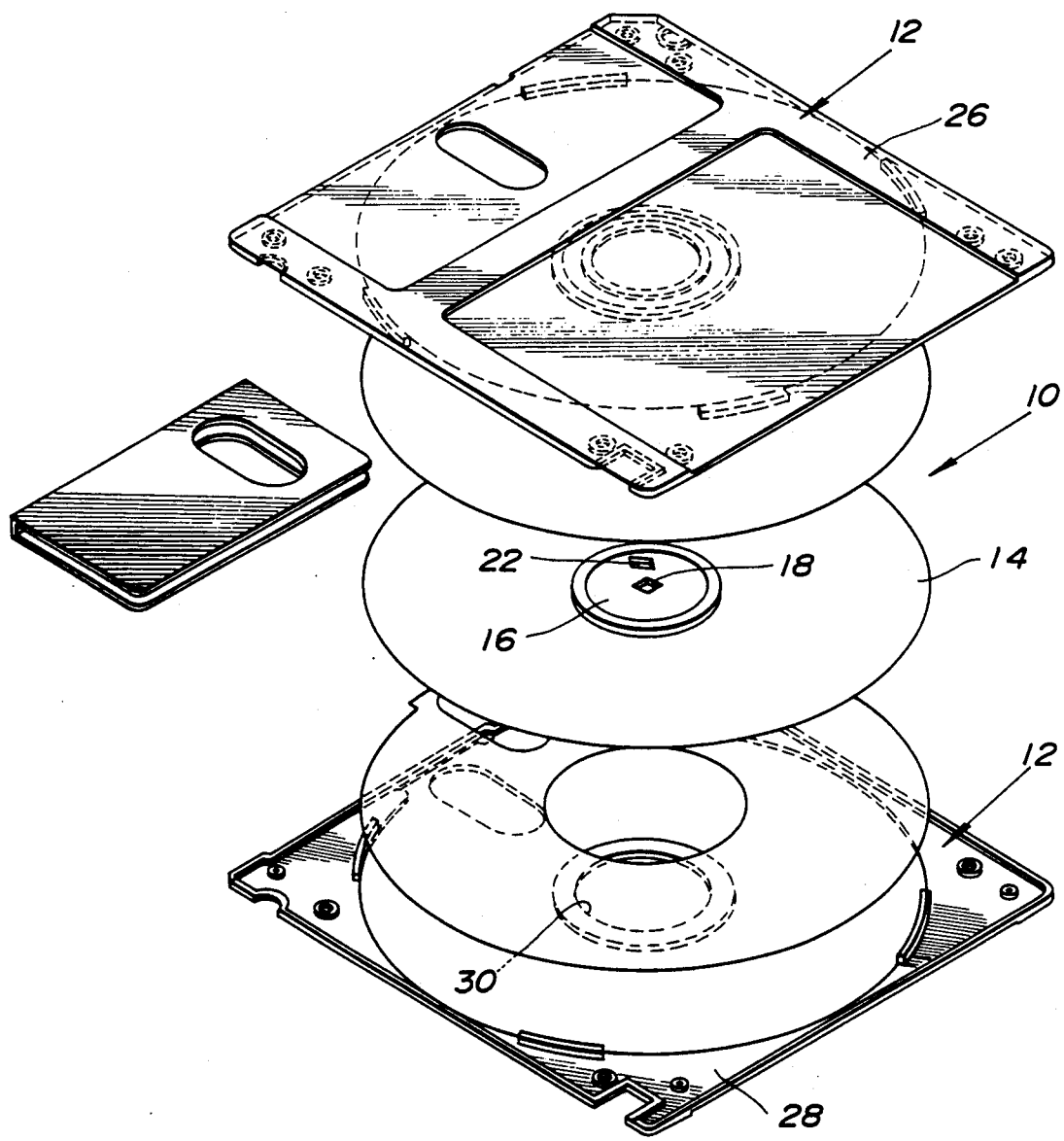
FIG. 1 is an exploded perspective view of a flexible magnetic disk cassette which can be driven by the preferred embodiment of a disk drive apparatus according to the present invention.
Figure 2:
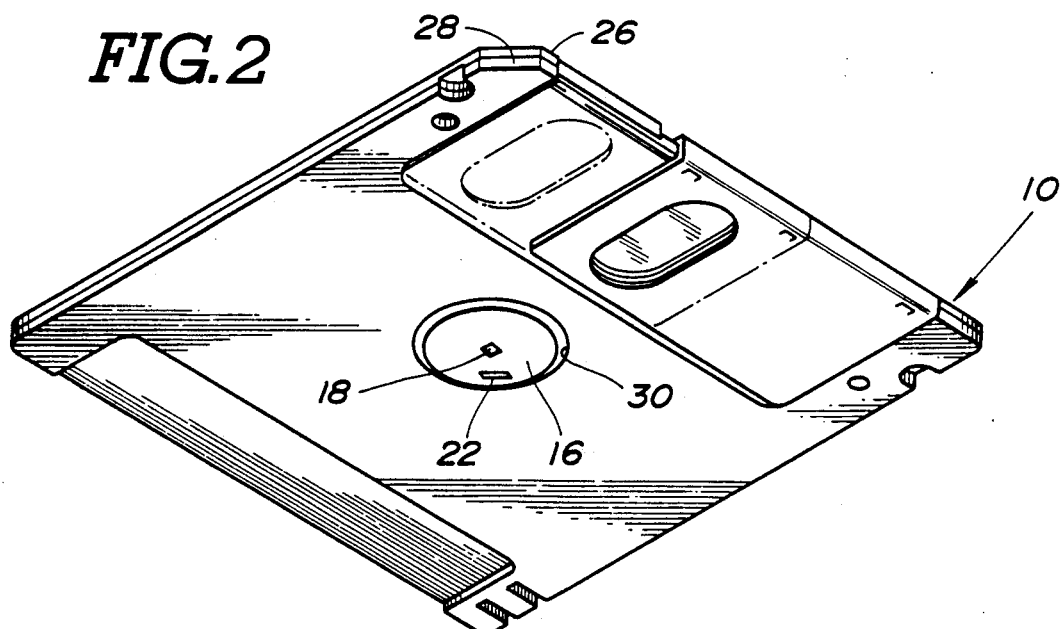
FIG. 2 is a perspective view of the flexible magnetic disk cassette of FIG. 1, as viewed from below.

Referring now to the drawings, particularly to FIGS. 1 and 2, a flexible magnetic disk cassette 10 which is suitable for use with the preferred embodiment of a disk drive apparatus according to the present invention has a cassette casing 12 housing a flexible magnetic disk 14. Such a disk is described in U.S. Pat. No. 4,445,115. The magnetic disk 14 is made of, for example, a thin disk-like high-density polymer film 0.4 mm thick, with a magnetic layer uniformly deposited on both surfaces to which a recording and/or reproducing magnetic head can be brought into contact. At the center of the magnetic disk 14, a center core disk 16 is fixedly attached to the magnetic disk 14. The center core disk 16 is made of a ferromagnetic material, such as iron.

The center core disk 16 has an essentially square center aperture 18 at its center. The center aperture 18 is designed to receive a motor shaft (of the tube shown in FIG. 3) of a disk drive device. An essentially rectangular driving and positioning aperture 22 is formed at a predetermined distance from the center aperture 18. The driving and positioning aperture 22 receives a drive pin 46 of the disk drive device. The center aperture 18 and the driving and positioning aperture 22 are so arranged that the diagonals of the square center aperture lie parallel to the sides of the driving and positioning aperture. The sides of the center aperture 18 are slightly longer than the diameter of the motor shaft 20 so that the motor shaft fits loosely in the center aperture. This permits the axis of the center aperture to be slightly offset from the center axis of the center core disk 16.

The cassette casing 12 comprises an upper half 26 and a lower half 28, both, for example, injection molded from ABS resin containing an antistatic agent. The upper and lower halves 26 and 28 are assembled to define an internal space which rotatably accommodates the magnetic disk 14. The lower half 28 has a center opening 30 near its center. The center core disk 16 is exposed through the center opening 30 of the lower half 28.

Further details of the construction of the flexible magnetic disk cassette of the type illustrated in FIG. 1 are available from U.S. Pat. No. 4,445,115 mentioned above. The contents of the aforementioned United States patent are hereby incorporated by reference for the sake of disclosure.

FIGS. 3 to 9 show the preferred embodiment of the disk drive apparatus according to the invention. The disk drive apparatus has a turntable assembly 40 on which the magnetic disk cassette 10 can be mounted. The turntable assembly 40 comprises a rotary base 42, a center pin 44, a drive pin 46, a drive pin support 48, a spring 50, a magnet plate 52, and a bearing sheet 54. The rotary base 42 is of a substantially disc-shaped configuration. The rotary base 42 has a center boss section 56. The rotary base 42 fixedly engages a motor shaft 20 of a disk drive motor (not shown), which extends vertically and firmly engages the center boss section 56 to transmit the driving force of the disk drive motor. Therefore, the rotary base 42 is driven to rotate by the disk drive motor. The rotary base 42 also has an essentially rectangular opening 58.

The upper end of the motor shaft 20, which protrudes upward through the center boss section 56 of the rotary base 42, serves as the center pin 44. The magnet plate 52 is essentially C-shaped and is made of magnetizable elastic or the like. The magnet plate 52 is fastened or bonded to the upper surface of the rotary base 42 so as to surround the center boss section 56. The bearing sheet 54 is made of a non-magnetic material and is in the form of an annular sheet matching the configuration and size of the uppermost face of the center boss section 56 of the rotary base 42. The bearing sheet 54 is fastened or bonded to the upper face of the center boss section 56 around the center pin 44.

The drive pin support 48 is mounted beneath the rotary base 42. The drive pin support 48 is made of stainless steel or the like and is essentially annular. The drive pin support 48 has an essentially U-shaped, non-resilient section 60 and an adjoining essentially U-shaped, resilient section 62 forming the integral annular configuration.

A pair of substantially straight sections 64 join the non-resilient section 60 and the resilient section 62. A resilient piece 68 integral with the cross bar of the "U" of the resilient section 62 extends therefrom oblique to the straight sections 64.

The drive pin 46 is mounted upright on the resilient piece 68. An annular bearing 70 is mounted atop the drive pin 46. The drive pin support 48 opposes the lower surface of the rotary base 42 so that the drive pin 46 extends upward through the rectangular opening 58 in the rotary base 42. The rectangular opening 58 is positioned relative to the center pin 44 in essentially the same relationship that the driving and positioning aperture 22 has relative to the center aperture 18 of the magnetic disk cassette 10.

Figure 3:
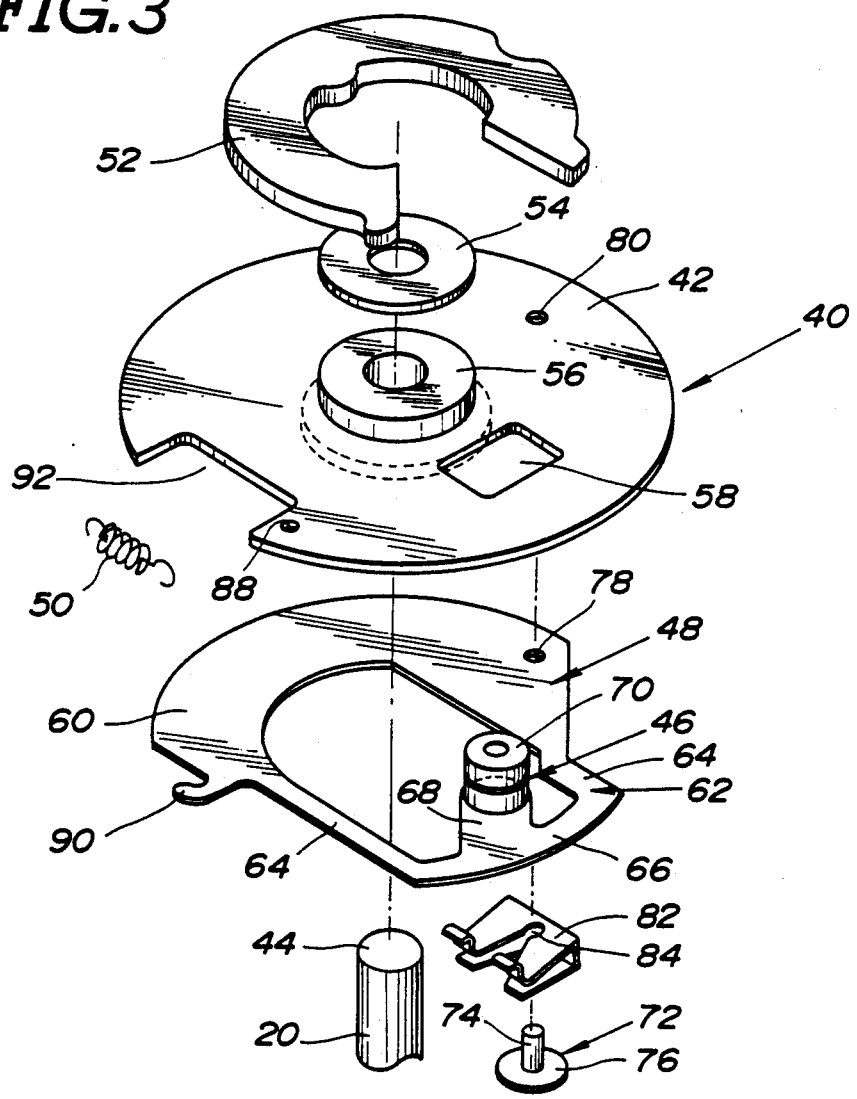
FIG. 3 is an enlarged exploded perspective view of the major part of the preferred embodiment of the disk drive apparatus according to the invention.
Figure 4:
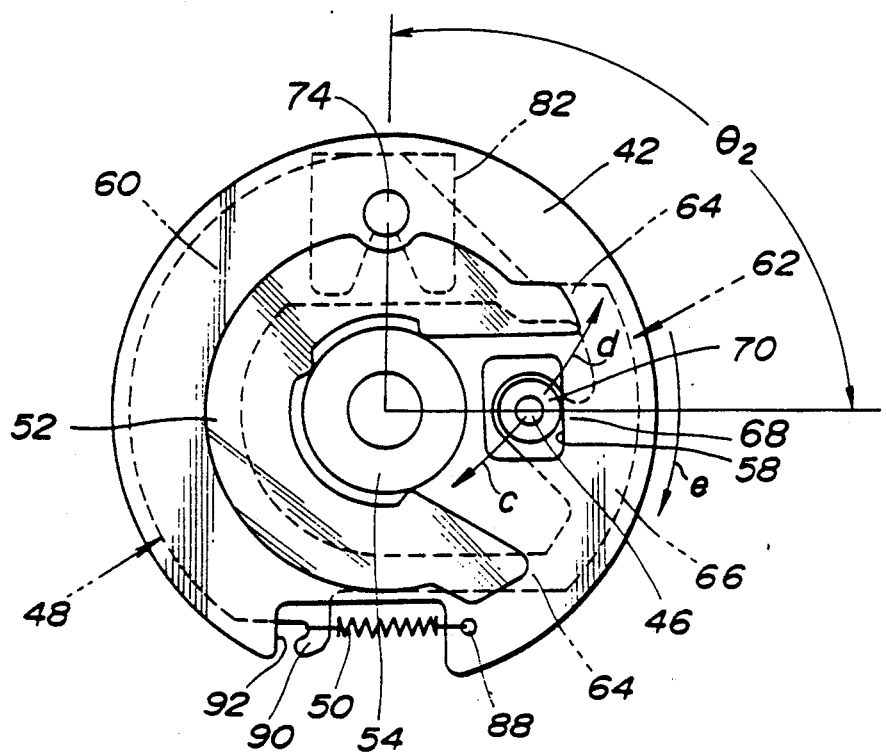
FIG. 4 is an enlarged plan view of the preferred embodiment of the disk drive apparatus of FIG. 3.
Figure 5:
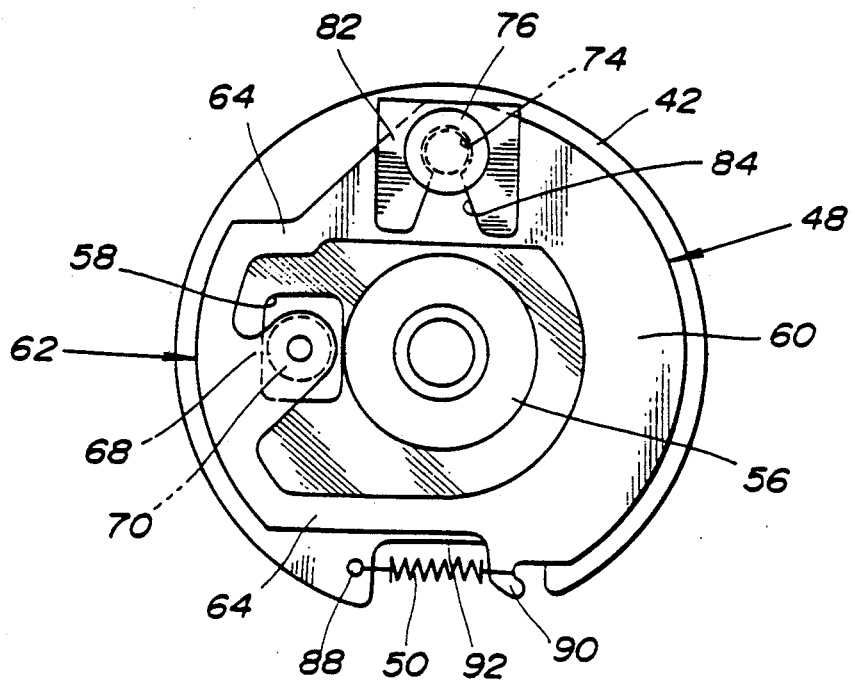
FIG. 5 is an enlarged bottom view of the the preferred embodiment of the disk drive apparatus of FIG. 3.
Figure 7:
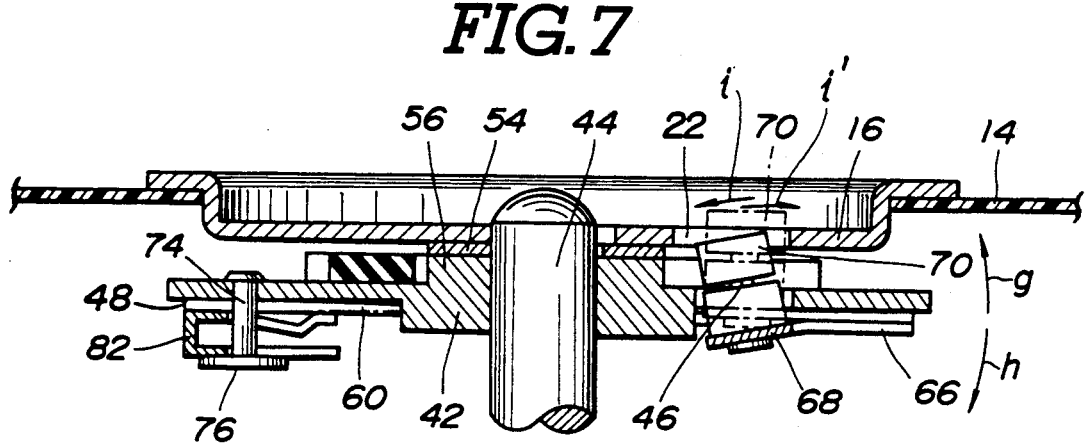
FIG. 7 is an enlarged sectional view taken along line VII—VII of FIG. 6.
Figure 8:
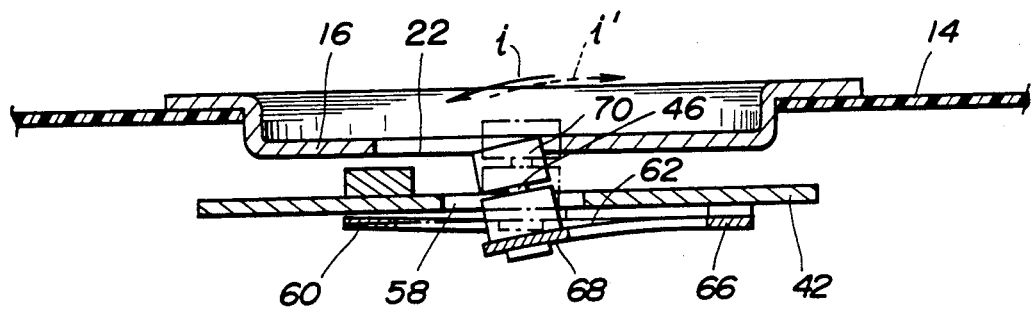
FIG. 8 is an enlarged sectional view taken along line VIII—VIII of FIG. 6.
Figure 9:
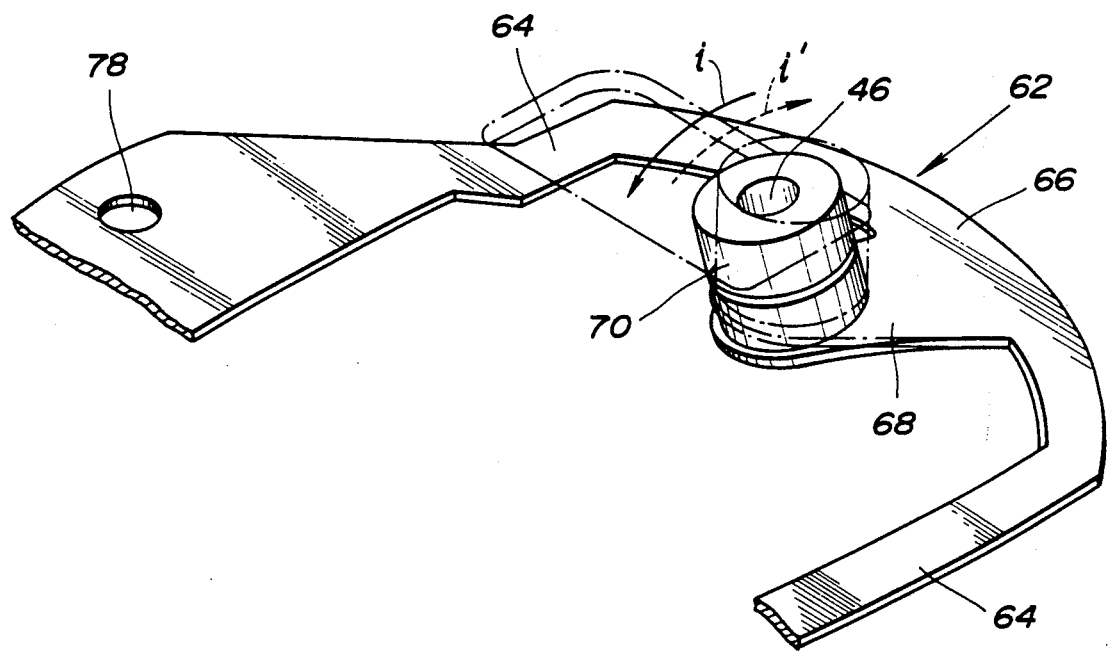
FIG. 9 is an enlarged perspective view showing the drive pin in its inclined position.

A pivot pin assembly 72 pivotally supports the drive pin support 48 beneath the rotary base 42. The pivot pin assembly 72 comprises a stem section 74 and a base section 76. The stem section 74 serves as a pivot axle of the drive pin support 48. The stem section 74 thus extends through an opening 78 in the non-resilient section 60 of the drive pin support 48 and engages an opening 80 through the rotary base 42. As best shown in FIG. 4, the 78 in the drive pin support 48 is offset from the drive pin 46 at an angle $\theta 2$ equal to about 90° in the direction opposite to the direction (represented by the arrow e in FIG. 4) of rotation of the turntable assembly 40. As best shown in FIGS. 3 and 7, a resilient leaf spring 82 engages the stem section 74 of the pivot 72 by means of a press-fit recess 84. The resilient leaf spring 82 is held between the lower surface of the drive pin support 48 and the upper surface of the base section 76 of the pivot. The combination of the stem section 74, base section 76, and the resilient leaf spring 82 exerts a resilient force biasing the drive pin support 48 toward the lower surface of the rotary base 42.

The top of the stem section 74 of the pivot 72 is caulked so as to couple the rotary base 42 to the drive pin support 48 and the resilient spring 82 while compressing the resilient leaf spring.

Thus, as the drive pin support 48 swivels, the drive pin 46 moves along the path indicated by arrows c and d in FIG. 4. The pivot point 80 of said drive pin support 60 on the rotary base 42 is selected for minimizing the circumferential component of displacement. As will be appreciated herefrom, the radial component of the travel of the drive pin 46 is greater than the angular component within the rectangular opening 58 of the rotary base 42. Therefore, the travel of the drive pin 46 within the rectangular opening 58 is predominantly radial as illustrated by the arrows c and d. Furthermore, the resilient section 62 of the drive pin support 48 can deform to allow pivotal movement of the drive pin relative to the vertical axis, as illustrated by arrows g and h in FIG. 7.

The spring 50 is a coil spring connecting the rotary base 42 and the drive pin support 48. One end of the coil spring 50 engages a hooking opening 88 in the rotary base 42. The other end of the coil spring 50 engages a hook 90 of the drive pin support 48 extending from the non-resilient section 60. The coil spring 50 is accommodated by a cutout 92 in the outer periphery of the rotary base 42. The coil spring 50 urges the drive pin support 48 and the drive pin 46 to rotate in the direction indicated by arrow d in FIG. 4, i.e., it tends to drive the drive pin 46 away from the center of the rotary base 42. Thus, the drive pin is displaceable at least in a direction toward and away from the center pin 44 in a plane which is substantially parallel to the upper surface of the rotary base 42.

In operation, first a microfloppy disc cassette 10 is placed on the turntable assembly 40 with the aid of the center aperture 18 and the driving and positioning aperture 22 of the center core disk 16 of the magnetic disk cassette 10, as shown in FIGS. 6 to 9. The center core disk 16 is drawn against the bearing sheet 54 by the magnetic attraction of the magnet plate 52.

If the driving and positioning aperture 22 of the center core disk 16 happens to be out of alignment with the drive pin 46, the center core disk will push the drive pin 46 downward, causing deformation of the resilient piece 64 of the drive pin support and downward shifting of the drive pin. At this time, the axis of the drive pin 46 inclines relative to the vertical in the direction indicated by arrow h in FIG. 7 against the resilient force of the leaf spring 82. As a result, the drive pin 46 abuts the lower surface of the center core disk 16 against the force of the resilient piece 64 and the resilient spring 82. When the turntable assembly 40 rotates in the direction indicated by arrow e in FIG. 6, as described later, the drive pin 46 shifts in the direction of arrow e with respect to the center core disk 16 until it is aligned with the driving and positioning aperture 22 of the center core disk 16. As a result, the drive pin 46 becomes free to move in the direction indicated by arrow g in FIG. 7, and thus loosely engages the driving and positioning aperture 22 due to the force of the resilient spring 82 and the resilient piece 64. Thus, the drive pin 46 rotating with the rotary base 42 drives the magnetic disk 14 to rotate in the direction e.

Figure 6:
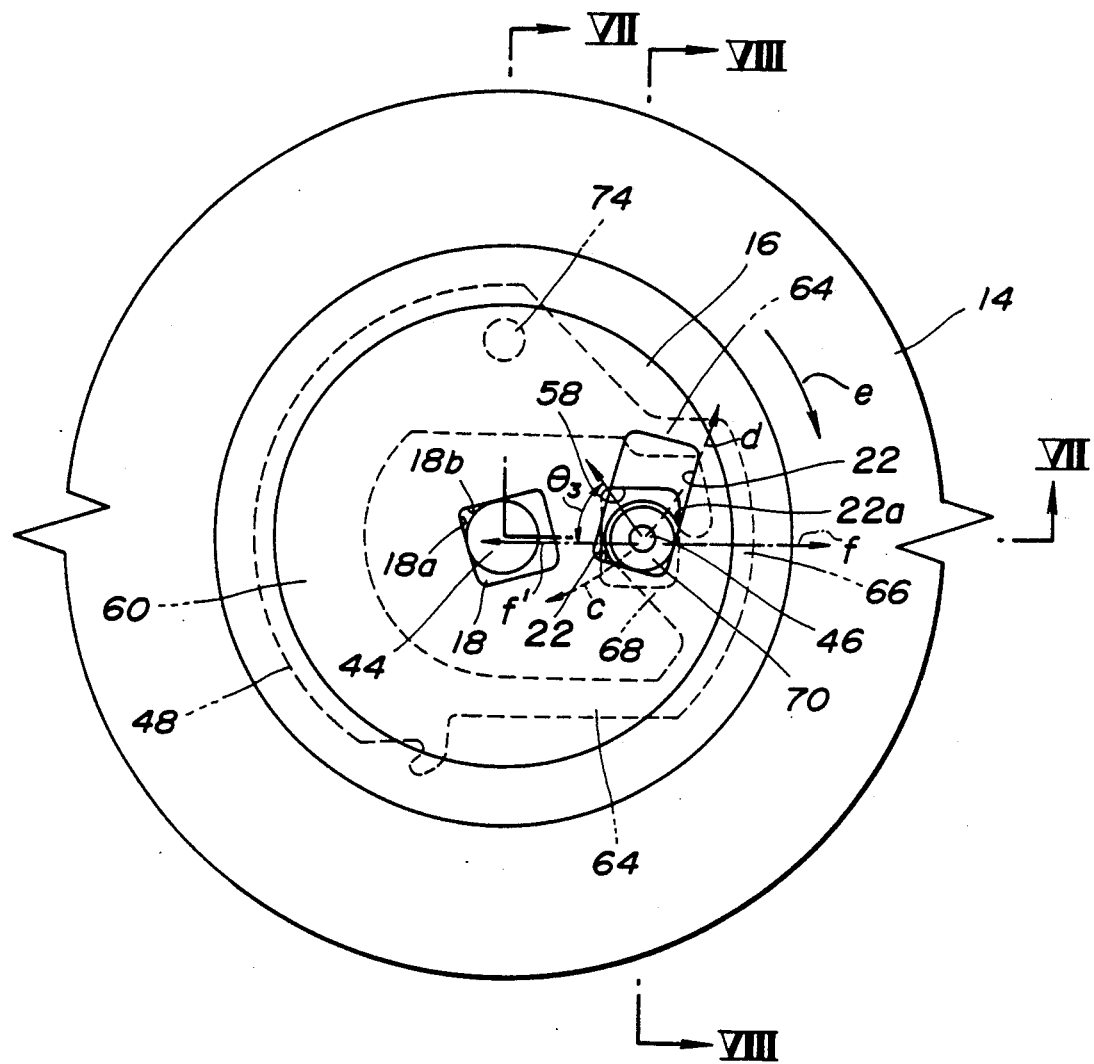
FIG. 6 is an enlarged plan view of the preferred embodiment of the disc drive apparatus when driving a magnetic disk.

Further rotation of the turntable assembly 40 in the direction e after establishing loose engagement between the drive pin 46 and the driving and positioning aperture 16, as shown in FIG. 6, actuates chucking of the magnetic disk cassette 10 on the turntable assembly 40 for centering and firm engagement between the center pin 44 and the center aperture 18 and between the drive pin 46 and the driving and positioning aperture 22. In the chucking operation, the drive pin 46 in the driving and positioning aperture 18 shifts with the drive pin support 48 about the pivot 72 in the direction c due to the centrifugal force exerted on the drive pin 46 against the resilient force of the coil spring 50 in the direction d. This causes the drive pin 46 to urge the driving and positioning aperture 22 in the direction f away from the center of the turntable assembly 40. At the same time, the drive pin 46 also pushes the driving and positioning aperture 22 in the direction e. As a result, the center pin 44 is pressed against the two edges 18a and 18b of the center aperture 18 whereby the magnetic disk 14 is accurately centered and firmly fixed on the rotary base 42 for rotation therewith. This condition of the magnetic disk 14 will be hereafter referred to as the "chucking position".

The chucking position, at which the drive pin 46 chucks the center core disk 16, is retained by the balance of forces urging the center pin 44 against the peripheral edges 18a and 18b of the center aperture 18 and urging the drive pin against the outer and front side peripheral edges 18a and 18b of the driving and positioning aperture 22.

According to the shown embodiment, since chucking of the center core disk 16 of the magnetic disk cassette 10 does not cause significant angular offset of the drive pin 46 relative to the driving and positioning aperture 22, the tracks can be recorded at fixed locations on the disk.

In addition, according to the invention, the drive pin 46 is able to incline to an angle of about 45° with respect to the radius of the turntable assembly 40 and in a direction indicated by arrow i generally opposite to the direction e of rotation of the turntable assembly 40 so that the function of the combination of the resilient section 62 of the drive pin support 48 and the resilient piece 64 permits the drive pin 46 to escape from the outer and front side peripheral edges of the driving and positioning aperture 22.

Since the drive pin support 48 is essentially annular, the strength of the resilient section 62 of the drive pin support is sufficient to hold the drive pin 46 essentially vertical. Accordingly, the drive pin 46 can be inclined in the direction labelled i and then return quickly in the direction i' to its vertical position drawn in the phantom lines of FIGS. 7 to 9, wherein the drive pin 46 occupies its normal position perpendicular to the center core disk 16 within the driving and positioning aperture 22 so as to drive the magnetic disk 14.

While the present invention has been disclosed in terms of the preferred embodiment in order to facilitate better understanding of the invention, it should be appreciated that the invention can be embodied in various ways without departing from the principles of the invention. Therefore, the invention should be understood to include all possible embodiments and modifications to the shown embodiments which can be embodied without departing from the principles of the invention set out in the appended claims.

For example, the angular offset $\theta_2$ of the pivot 72 with respect to the drive pin 46 is limited in no way to 90° but may be any desired angle permitting the drive pin 46 to move predominantly radially.

The annular shape of the drive pin support 48 and the shape of the resilient section 62 of the drive pin support may be modified to any desired configuration appropriate for implementing the desired operation explained above.

The present invention is not limited to use in microfloppy disk drive apparatus, but is applicable to various recording and/or reproducing disk drive apparatus.

What is claimed is:

1. A disk drive apparatus for rotatingly driving a magnetic disk of the type having a center aperture and a driving and positioning aperture, comprising:
   a rotary base means for rotating a magnetic disk, the rotary base means having an upper surface mounting thereon for supporting the magnetic disk;
   a center pin fixedly mounted on the rotary base means for rotation therewith and for engaging the center aperture of a disk being driven;
   a drive pin for engaging the driving and positioning aperture of the disk and drive pin support means for mounting the drive pin on the rotary base means for rotation therewith such that the drive pin is displaceable at least in a direction toward and away from the center pin in a plane substantially parallel with the upper surface of the rotary base means and the axis of the drive pin is inclinable both generally toward the center pin and generally in a direction opposite to the direction of rotation of the rotary base means, for chucking and centering a magnetic disk on the rotary base means.

2. A disk drive apparatus as set forth in claim 1, wherein the drive pin support means, in supporting the drive pin, allows displacement of said drive pin in said plane within the driving and positioning aperture of a disk mounted on the rotary base means.

3. A disk drive apparatus as set forth in claim 2, wherein said drive pin support means is pivotably mounted on said rotary base means at a pivot point for shifting said drive pin in radial and circumferential directions, and wherein said pivot point of said drive pin support on said rotary base means is selected for minimizing the circumferential component of displacement.

4. A disk drive apparatus as set forth in claim 3, wherein the drive pin support means resiliently biases the drive pin to remain in the plane and is resiliently deformable for including the axis of the drive pin in a direction which forms an angle of about 45° with the radius of the rotary base means for establishing engagement between the drive pin and the driving and positioning aperture.

5. A disk drive apparatus as set forth in claim 3, wherein the drive pin support means exerts a resilient biasing force on the drive pin.

6. A disk drive apparatus as set forth in claim 3, wherein the magnetic disk is of the type whose center aperture has a first centering edge and a second centering edge and the driving and positioning aperture has a centering edge and a driving edge and further wherein when the magnetic disk is chucked on the rotary base means the center pin abuts the first and second center edges of the center aperture and the drive pin abuts the driving edge and the positioning edge of the positioning aperture.

7. A disk drive apparatus for rotatingly driving a magnetic disk of the type having a center positioning aperture and a driving and positioning aperture which is located at a position offset from the center positioning aperture by a given radial distance, comprising:
   a center pin for engagement with the center positioning aperture;
   a drive pin for engagement with the driving and positioning aperture;
   a rotary base means on which the center pin is mounted at essentially the center position of the rotary base means and rotating with it, the rotary base means having an upper plane surface for receiving and supporting a magnetic disk thereon;
   a drive pin support means for mounting the drive pin to be engageable with the driving and positioning aperture of a magnetic disk, the drive pin support means being pivotally mounted on the rotary base means for pivotal movement in a plane substantially parallel with the upper surface of the rotary base means and being deformable for inclining the axis of the drive pin relative to an axis parallel to the axis of the center pin in a direction both generally toward the center pin and in a direction oppose to the direction of rotation of the rotary base means.

8. A disk drive apparatus as set forth in claim 7, wherein the drive pin support means comprises a resilient member which is resiliently deformable to cause the inclination of the drive pin axis.

9. A disk drive apparatus as set forth in claim 7, wherein the displacement of the drive pin includes a radial component for shifting the drive pin relative to the center pin for varying the relative radial distance therebetween.

10. A disk drive apparatus as set forth in claim 7, further comprising means for pivotally mounting said drive pin support means to be displaceable relative to said rotary base means in a direction other than the circumferential direction.

11. A disk drive apparatus as set forth in claim 10, wherein said displacement of said drive pin includes a radial component for shifting said drive pin relative to said center pin for varying the relative radial distance therebetween.

12. A disk drive apparatus as set forth in claim 4, for driving a magnetic disk with a center positioning aperture which has a first centering edge and a second centering edge and said driving and positioning aperture which has a centering edge and a driving edge, wherein said drive pin support means is pivotally displaceable for varying the relative radial distance between said center pin and said drive pin for chucking engagement between said center pin and the first and second centering edges of the center positioning aperture and between said drive pin and the centering edge and the driving edge of the driving and positioning aperture.

13. A combination of a flexible magnetic disk cassette and a disk drive apparatus for driving the same, wherein the flexible magnetic disk cassette comprises:
a flexible magnetic disk;
a cover containing the flexible magnetic disk, the cover having a driving hole for driving the flexible disk therethrough; and
a center core disk rigidly and immovably secured at the center of the flexible magnetic disk, the center core disk having a center aperture with first and second converging, centering sides, and a driving and positioning aperture having a positioning edge and a driving edge; and wherein
the disk drive apparatus comprises:
a rotary base means for rotating the magnetic disk, the rotary base means having an upper surface for mounting thereon the magnetic disk;
a center pin fixedly mounted on the rotary base means for rotating therewith and mating with the first and second converging centering sides of the center aperture;
a drive pin engageable with the driving and positioning aperture and adapted to mate with the positioning edge and the driving edge and drive pin support means for mounting the drive pin on the rotary base means for rotation therewith such that the drive pin is displaceable at least in a direction toward and away from the center pin in a plane substantially parallel to the upper surface of the rotary base means and the axis of the drive pin is inclinable both generally toward the center pin and in a direction generally opposite to the direction of rotation of the rotary base means, for chucking and centering the magnetic disk on the rotary base means.

14. A combination as set forth in claim 13, wherein the drive pin support means is pivotally mounted at a point on the rotary base means for shifting the drive pin in radial and circumferential directions for establishing chucking engagement between the center pin and the first and second converging centering sides of the center aperture and between the drive pin and the positioning edge and the driving edge of the driving and positioning aperture, and wherein the pivot point of the drive pin support means on the rotary base means is selected for minimizing the circumferential component of displacement.

15. A combination as set forth in claim 13, wherein the drive pin support means is resilient and is deformable for inclining the axis of the drive pin.

* * * * *